US011974555B1

(12) United States Patent
Hamilton

(10) Patent No.: US 11,974,555 B1
(45) Date of Patent: May 7, 2024

(54) MARINE ANIMAL NETTING DEVICE AND METHOD OF USE

(71) Applicant: Joseph Hamilton, Magnolia, TX (US)

(72) Inventor: Joseph Hamilton, Magnolia, TX (US)

( * ) Notice: Subject to any disclaimer, the term of this patent is extended or adjusted under 35 U.S.C. 154(b) by 45 days.

(21) Appl. No.: 17/973,200

(22) Filed: Oct. 25, 2022

(51) Int. Cl.
*A01K 77/00* (2006.01)
*A01K 87/00* (2006.01)

(52) U.S. Cl.
CPC ............ *A01K 77/00* (2013.01); *A01K 87/007* (2013.01)

(58) Field of Classification Search
CPC .............................. A01K 77/00; A01K 87/007
See application file for complete search history.

(56) References Cited

U.S. PATENT DOCUMENTS

| 1,797,251 | A | * | 3/1931 | Tyrrell | .................... | A01K 77/00 43/5 |
| 6,584,724 | B1 | | 7/2003 | Le Blanc | | |
| 7,337,576 | B2 | * | 3/2008 | Boltan | ................. | A01K 87/007 43/7 |
| 8,806,801 | B2 | | 8/2014 | Steffens | | |
| 2018/0014515 | A1 | * | 1/2018 | Waters | .................... | A01K 97/00 |
| 2019/0335731 | A1 | | 11/2019 | Kleckner | | |

* cited by examiner

*Primary Examiner* — Richard G Davis

(57) ABSTRACT

A marine animal netting device for catching crabs includes a pole, which is selectively extensible. A net is pivotally attached to the pole proximate to a first end of the pole and a handle attached to a second end of the pole. A line is loopedly positioned on and selectively extensible from a reel, which is attached to the handle, through line guides attached to the pole, and past the net. A connector, which is attached to a terminus of the line, is used to connect a bait. The handle is gripped in a hand of a user to manipulate the net and the bait into a body of water to attract a marine animal. The reel is used to reel in the bait and the marine animal into a position over the net, allowing the user to raise the net to catch the marine animal.

18 Claims, 7 Drawing Sheets

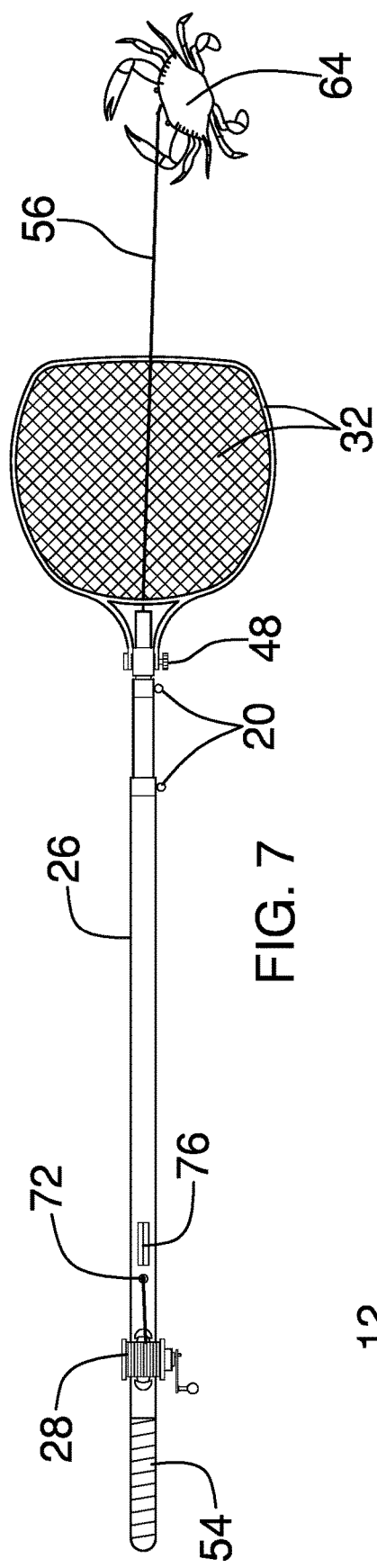
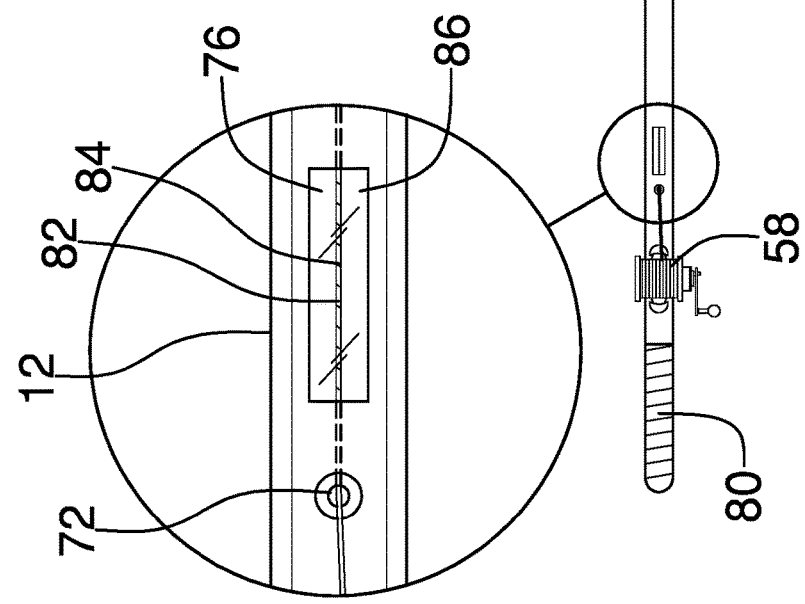

MARINE ANIMAL NETTING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to netting devices and more particularly pertains to a new netting device for catching crabs. The present invention discloses a netting device comprising a pole to which a net is pivotally attached. A bait on a hook is positionable past the net to attract crabs and then is reeled in so that the crabs can be captured in the net.

(2) Description of Related Art Including Information Disclosed Under 37 CFR 1.97 and 1.98

The prior art relates to netting devices, which may comprise nets attached to extendable poles, nets attached to belt worn retractors, fishing rod and net combinations, and nets hingedly attached to poles, such that the nets can be hinged for stowage. What is lacking in the prior art is a netting device comprising a pole to which a reel and a net are attached. The net can be pivoted relative to the pole and the pole selectively extended to reach a desired configuration for a particular environment. Bait attached to the reel via a line and a hook can be past the net to attract crabs and then reeled in over the net so that the crabs can be captured in the net.

BRIEF SUMMARY OF THE INVENTION

An embodiment of the disclosure meets the needs presented above by generally comprising a pole, which is tubular and which comprises a plurality of nested sections so that the pole is selectively extensible. A net is pivotally attached to the pole proximate to a first end of the pole and a handle attached to a second end of the pole. A line is loopedly positioned on and selectively extensible from a reel, which is attached to the handle, through a plurality of line guides, which is attached to the pole, and past the net. A connector is attached to a terminus of the line and is configured to connect to a bait. The handle is configured to be gripped in a hand of a user, enabling the user to manipulate the net and the bait into a body of water to attract a marine animal. The reel is configured to reel in the bait and the marine animal into a position over the net, allowing the user to raise the net to catch the marine animal.

Another embodiment of the disclosure includes a method of catching a marine animal. The method comprises a provision step, which entails providing a marine animal netting device, according to the disclosure above. Deployment steps of the method include extending the pole to a desired length, pivoting the net to a desired angle relative to the pole, and extending the connector to a desired position past the net. A baiting step of the method entails providing a bait and attaching the bait to the connector. An operational step of the method entails gripping the handle and using the pole to manipulate the net and the bait into a body of water. Catching steps of the method are waiting for a marine animal to attach to the bait, reeling in the bait and the marine animal into a position over the net, and raising the net to catch the marine animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is an in-use view of an embodiment of the disclosure.

FIG. 8 is an in-use view of an embodiment of the disclosure.

DETAILED DESCRIPTION OF THE INVENTION

Figure 1:
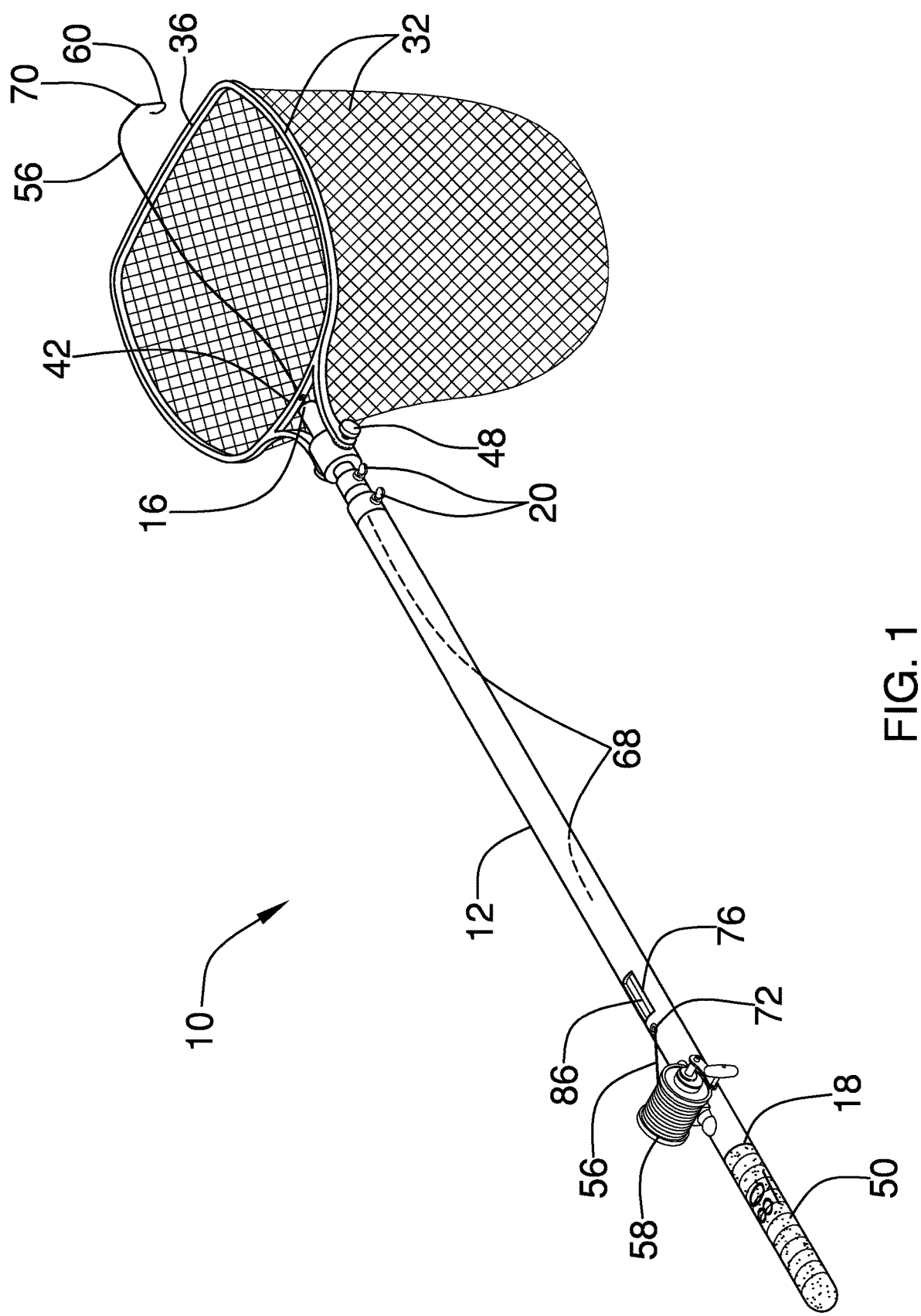
FIG. 1 is an isometric perspective view of a marine animal netting device according to an embodiment of the disclosure.

With reference now to the drawings, and in particular to FIGS. 1 through 9 thereof, a new netting device embodying the principles and concepts of an embodiment of the disclosure and generally designated by the reference numeral 10 will be described.

As best illustrated in FIGS. 1 through 9, the marine animal netting device 10 generally comprises a pole 12, which is tubular and which comprises a plurality of nested sections 14 so that the pole 12 is selectively extensible. Unlike a fishing pole, the pole 12 of the marine animal netting device 10 is substantially rigid. Upon full extension, a first end 16 and a second end 18 of the pole 12 are separated by 3.50 to 5.50 m. Upon full extension, the first end 16 and the second end 18 may be separated by 4.25 to 4.75 m.

Figure 5:
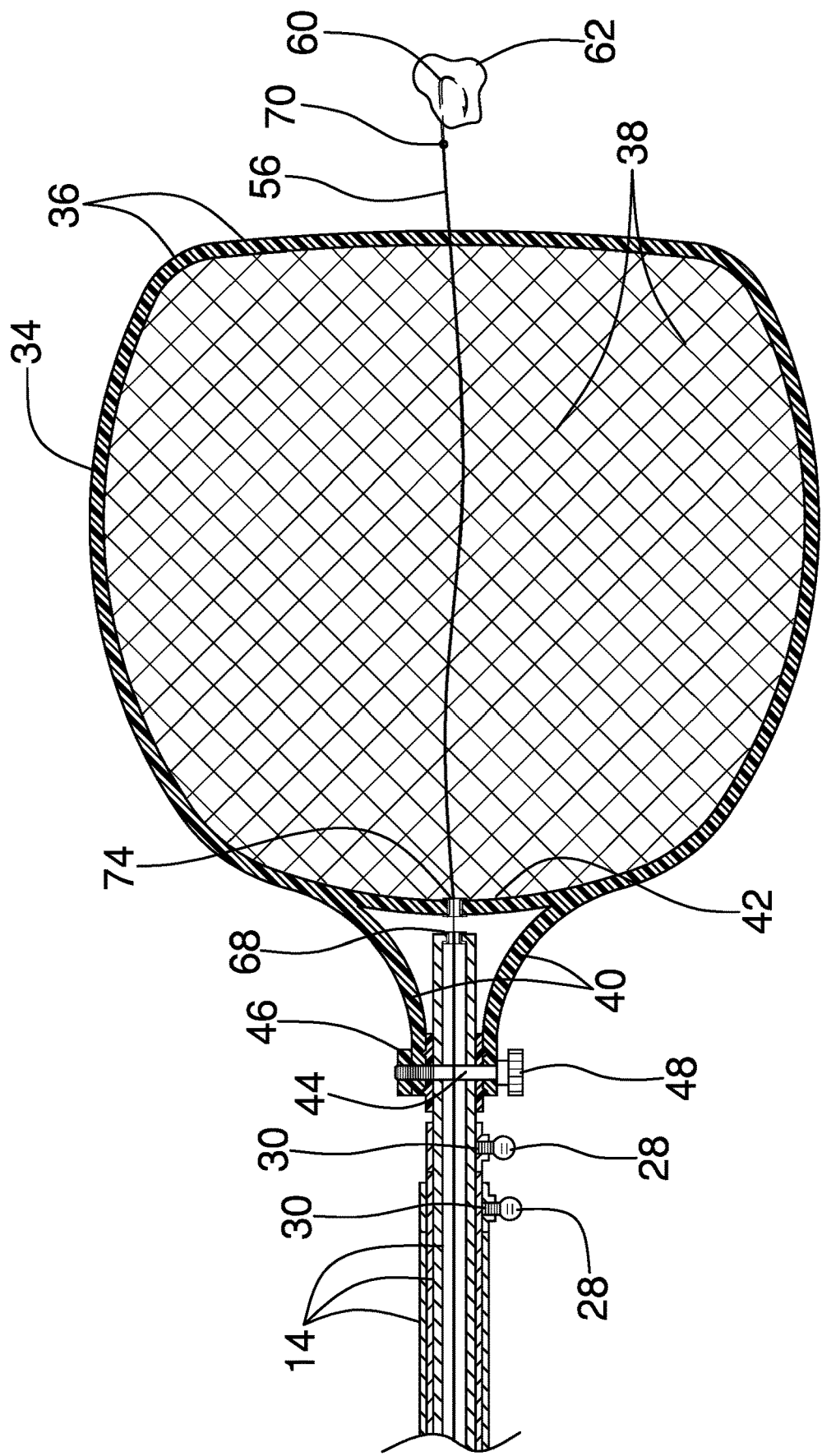
FIG. 5 is a cross-sectional view of an embodiment of the disclosure.
Figure 6:
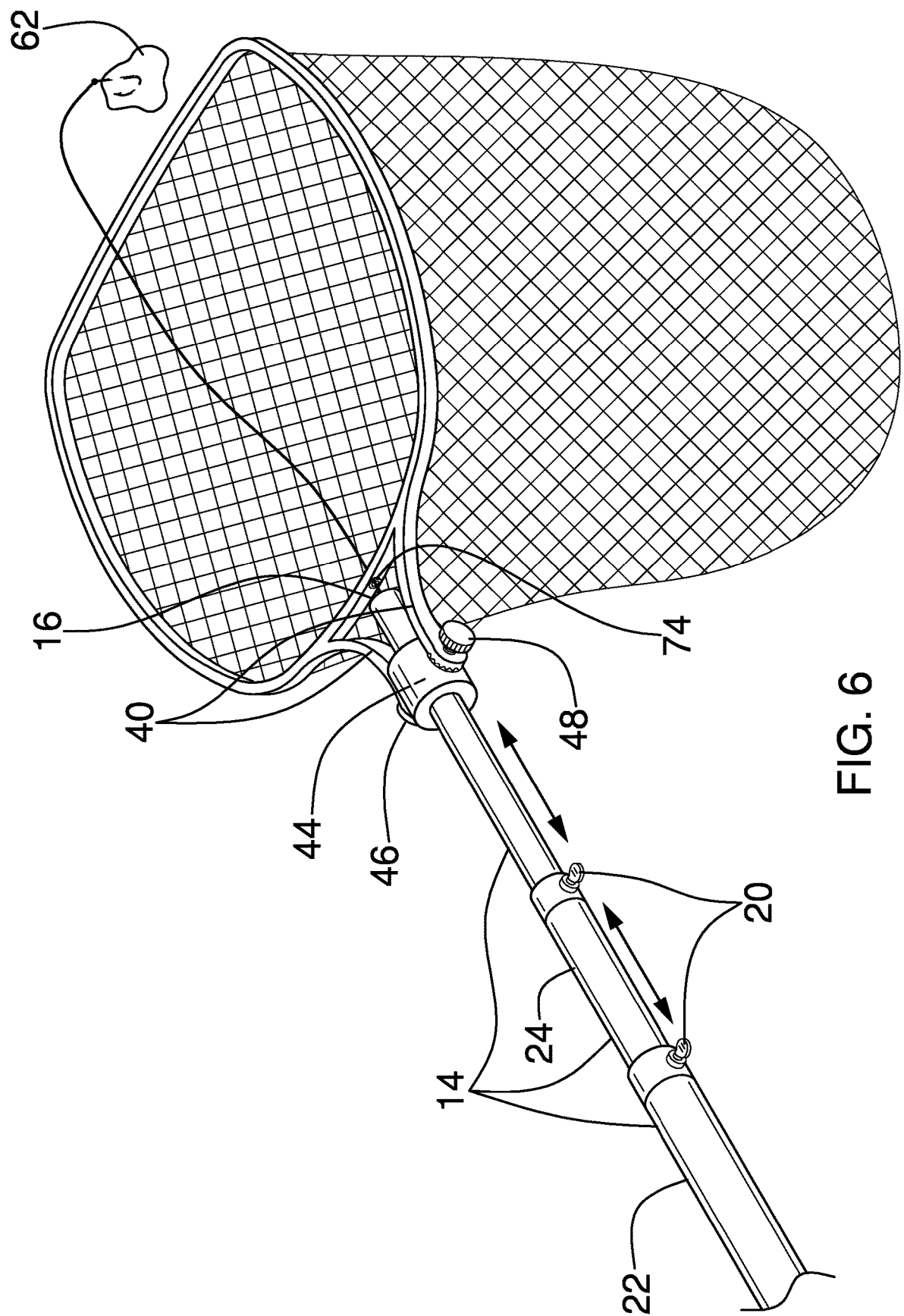
FIG. 6 is a detail view of an embodiment of the disclosure.
Figure 9:
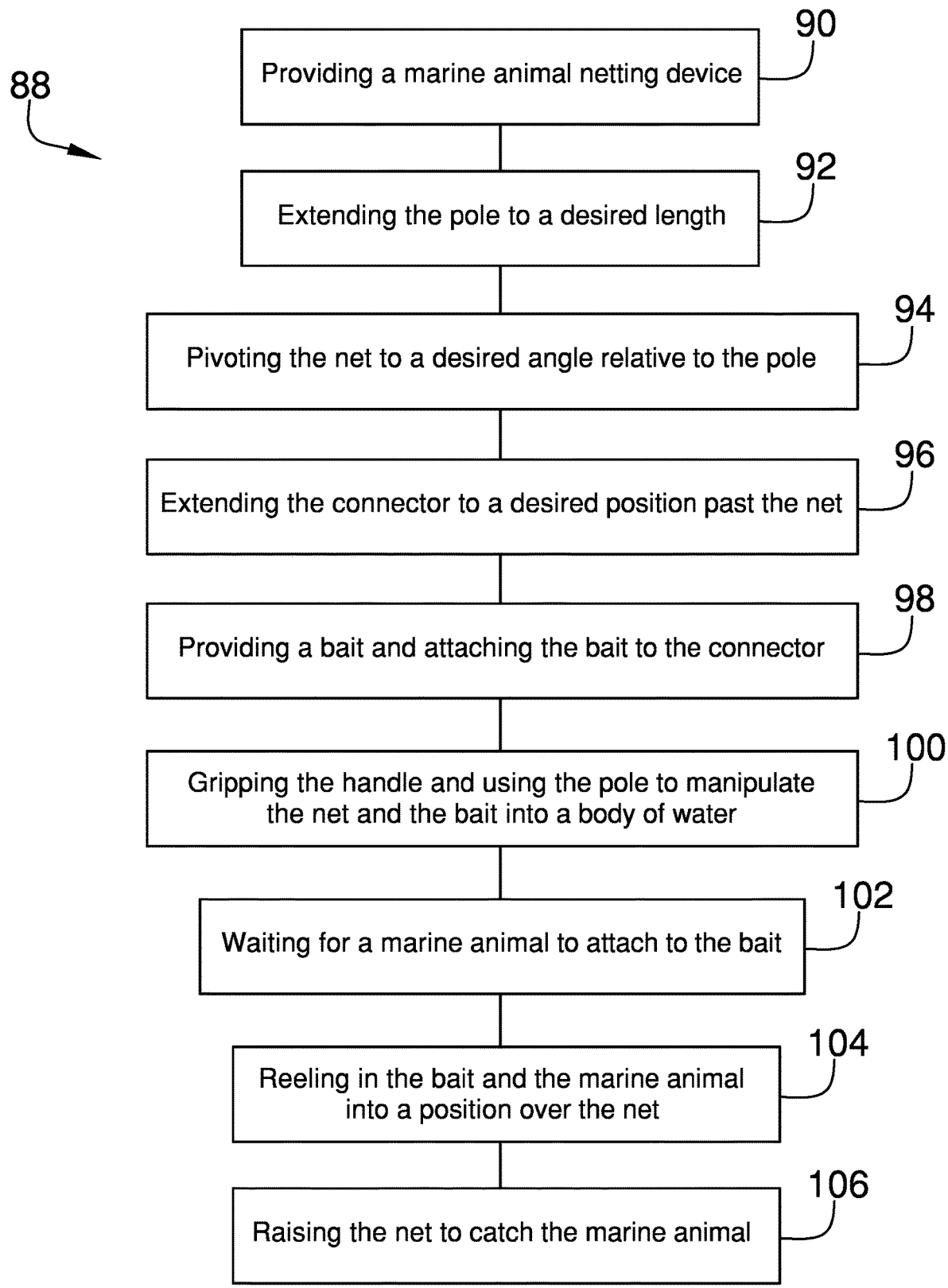
FIG. 9 is a flow diagram for a method utilizing an embodiment of the disclosure.

Each fastener 20 of a set of fasteners 20 is attached to an outer one 22 of the nested sections 14 and is configured to selectively engage an inner one 24 of the nested sections 14 so that the nested sections 14 are selectively fixedly engaged. A user thus can adjust an effective length 26 of the pole 12 by partially or completely extending one or more of the nested sections 14. As shown in FIG. 5, each fastener 20 may comprise a thumbscrew 28, which is positioned in a threaded hole 30 so that turning of the thumbscrew 28 selectively frictionally engages the thumbscrew 28 to the inner one 24 of the nested sections 14. The present invention also anticipates the fastener 20 comprising other fastening means, such as, but not limited to, twist locks, cam locks, or the like.

Figure 3:
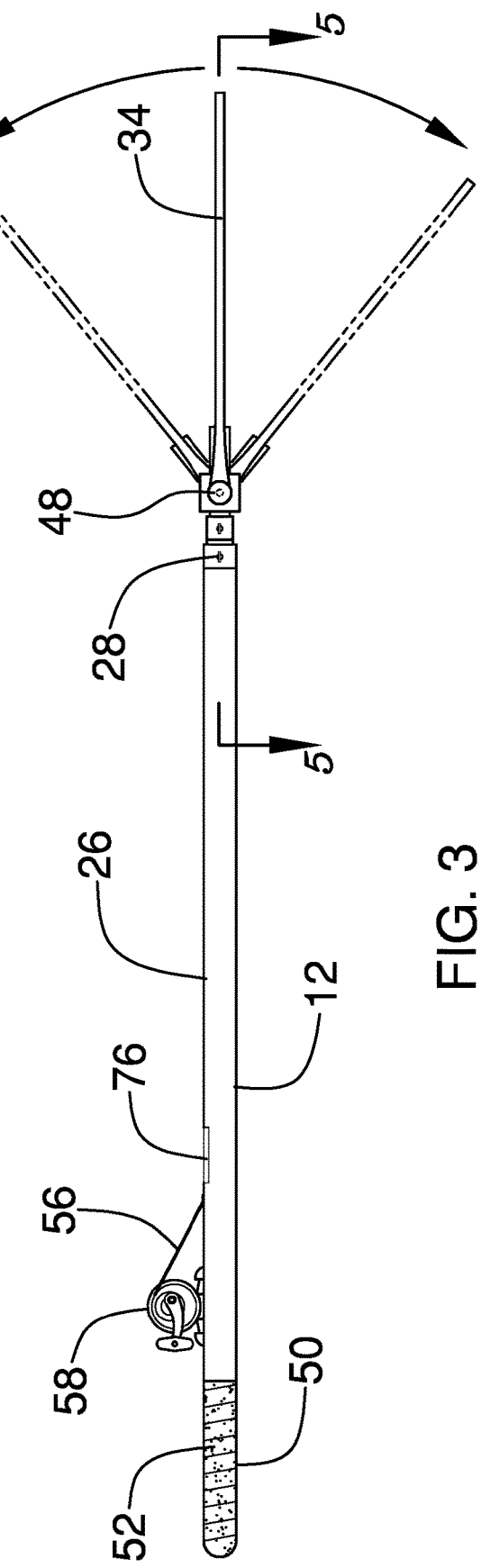
FIG. 3 is a side view of an embodiment of the disclosure.

A net 32 is pivotally attached to the pole 12 proximate to the first end 16 of the pole 12, as shown in FIG. 3. As will become apparent, the net 32 being pivotable relative to the pole 12 allows the user to adjust the configuration of the marine animal netting device 10 to complement a contour of a bottom of a lake, a river, an ocean, or the like. The net 32 comprises a ring 34, a first side 36 of which is distal from the first end 16 of the pole 12 and substantially linear. As will become apparent, the first side 36 of the ring 34 being linear facilitates its sliding along the bottom of the lake, the river, the ocean, or the like.

A mesh 38 is attached to and extends from the ring 34. A pair of arms 40 extends from a second side 42 of the ring 34, with the arms 40 bracketing the pole 12. A bolt 44 extends through the pair of arms 40 and the pole 12 so that the net 32 is pivotable relative to the pole 12. A nut 46 is fixedly attached to a respective one of the arms 40 and is opposingly positioned to a head 48 of the bolt 44. The nut 46 is threadedly engaged to the bolt 44 so that turning of the bolt 44 selectively tightens the arms 40 to the pole 12 to fixedly position the net 32 relative to the pole 12. The present invention also anticipates other means for adjustably attaching the net 32 to the pole 12, such a gooseneck connectors, pivot balls, or the like.

A handle 50 is attached to the second end 18 of the pole 12. An exterior surface 52 of the handle 50 comprises rubber, silicone, or elastomer and thus is configured to deter slippage of the hand that is gripping the handle 50. The present invention also anticipates the handle 50 comprising a segment 54 of the pole 12.

Figure 2:
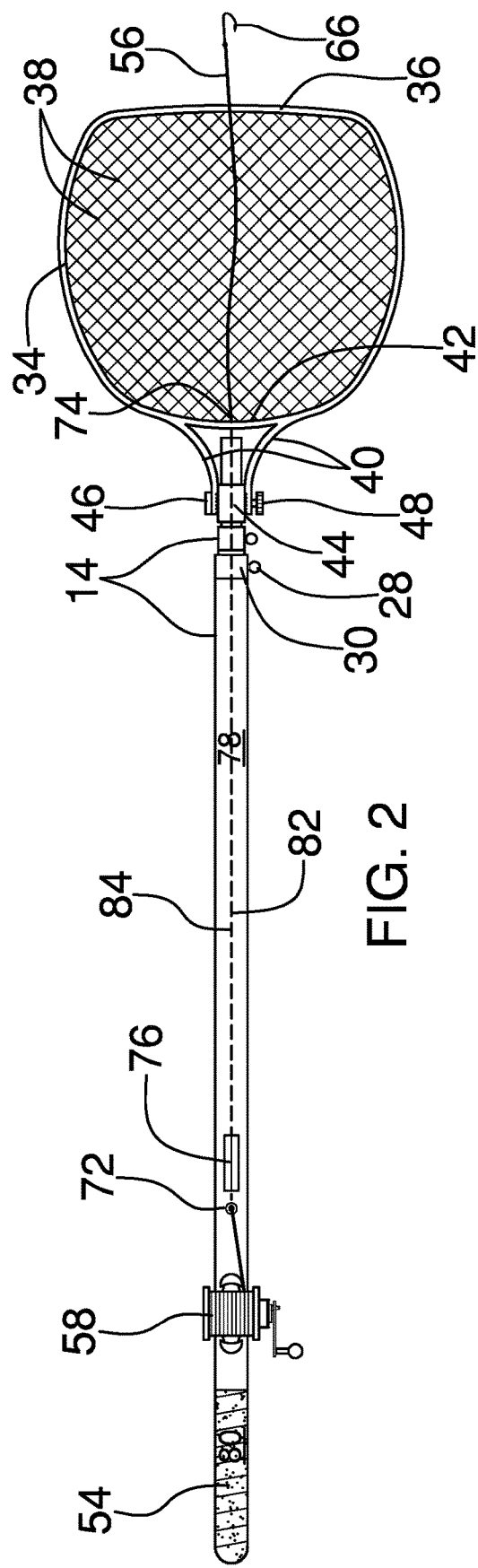
FIG. 2 is a top view of an embodiment of the disclosure.

A line 56 is loopedly positioned on and selectively extensible from a reel 58, which is attached to the handle 50, through a plurality of line guides 68, which is attached to the pole 12, and past the net 32. The reel 58 may be selectively attachable to the handle 50. A connector 60 is attached to a terminus 70 of the line 56 and is configured to connect to a bait 62, often meat, such as chicken, beef, hotdogs, or the like. The connector 60 may comprise a hook 66, as shown in FIG. 2, or other connecting means, such as, but not limited to, meshed bags, slip knotted cords, or the like.

The handle 50 is configured to be gripped in a hand of the user, enabling the user to manipulate the net 32 and the bait 62 into a body of water to attract a marine animal 64. The reel 58 is configured to reel the bait 62 and the marine animal 64 into a position over the net 32, allowing the user to raise the net 32 to catch the marine animal 64. Marine animals 64 includes crustaceans, such as crabs, crayfish, and the like, but the marine animal netting device 10 can be used to catch other marine animals 64 of interest to the user.

Figure 4:
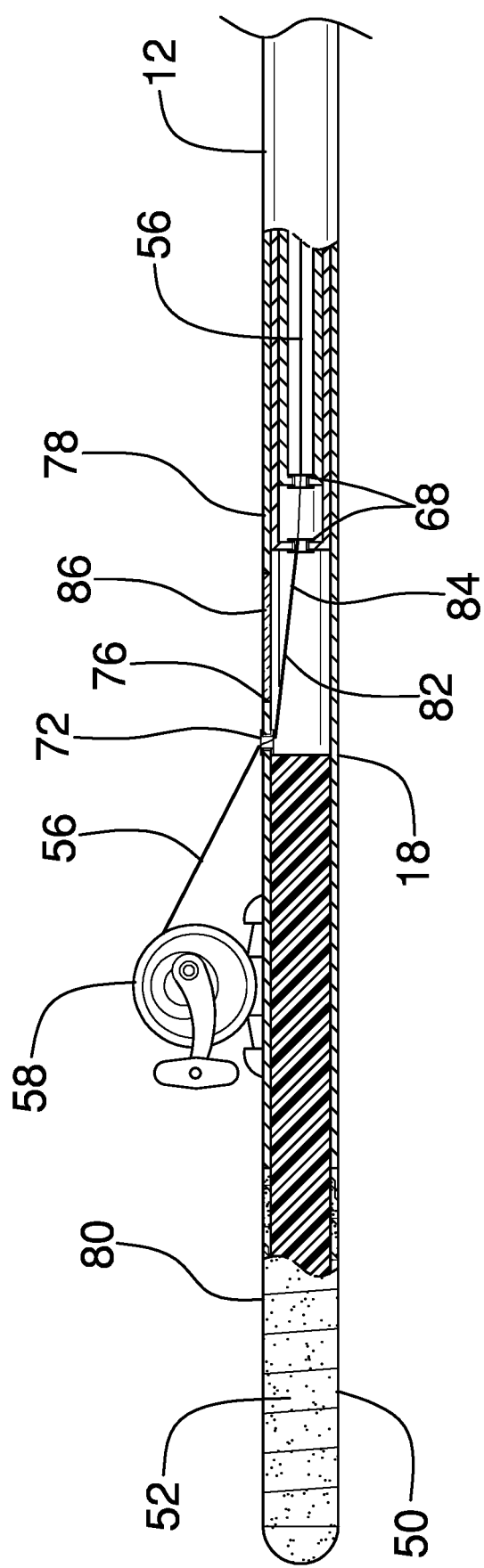
FIG. 4 is a cross-sectional view of an embodiment of the disclosure.

As shown in FIG. 4, the plurality of line guides 68 is positioned within the pole 12 and a hole 72 is positioned in the pole 12 proximate to the second end 18. The line 56 extends through the hole 72, the line guides 68 within the pole 12, and out the first end 16 of the pole 12. As shown in FIG. 5, the line 56 also extends through an aperture 74, which is positioned in the ring 34 proximate to the first end 16 of the pole 12.

A cutout 76 is positioned in the pole 12, proximate to the hole 72, so that line 56 is visible through the cutout 76. As shown in FIG. 2, the cutout 76 and the hole 72 are positioned in an upper face 78 of the pole 12 while the reel 58 is positioned on an upper facet 80 of the handle 50, thereby allowing the user to view the line 56 through the cutout 76 while operating the reel 58. An indicator 82, which may comprise a section of colored line 84, is attached to the line 56 and is visible through the cutout 76 when the connector 60 is positioned over the net 32. The section of colored line 84 may be red or other bright color.

A panel 86 may be attached to the pole 12 and extend over the cutout 76. The panel 86 is substantially transparent so that the indicator 82 is visible through the panel 86. Upon viewing the indicator 82 in the cutout 76, the user can be assured that the bait 62 and any attached marine animals 64 are positioned over the net 32, allowing the user to raise the net 32 to catch the marine animals 64. The present invention also anticipates a bulb attached to and positioned in the pole 12, proximate to the cutout 76, to facilitate viewing of the indicator 82 in low ambient light conditions.

In use, the marine animal netting device enables a method of catching a marine animal 88 comprising a provision step 90, which entails providing a marine animal netting device 10, according to the specification above. First 92, second 94, and third 96 deployment steps of the method 88 can be performed in any order and include extending the pole 12 to a desired length 26, pivoting the net 32 to a desired angle relative to the pole 12, and extending the connector 60 to a desired position past the net 32, respectively. A baiting step 98 of the method 88 entails providing a bait 62 and attaching the bait 62 to the connector 60. An operational step 100 of the method 88 entails gripping the handle 50 and using the pole 12 to manipulate the net 32 and the bait 62 into a body of water, typically at a bottom of the body of water. First 102, second 104, and third 106 catching steps of the method 88 are waiting for a marine animal 64 to attach to the bait 62, reeling the bait 62 and the marine animal 64 into a position over the net 32, and raising the net 32 to catch the marine animal 64, respectively.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A marine animal netting device comprising:
   a pole, the pole being tubular and comprising a plurality of nested sections, such that the pole is selectively extensible;
   a net pivotally attached to the pole proximate to a first end of the pole;
   a handle attached to a second end of the pole;
   a plurality of line guides attached to the pole;
   a reel attached to the handle;
   a line loopedly positioned on and selectively extensible from the reel through the line guides and past the net; and
   a connector attached to a terminus of the line and being configured for connecting to a bait, wherein the handle is configured for gripping in a hand of a user for manipulating the net and the bait into a body of water for attracting a marine animal, wherein the reel is configured for reeling in the bait and the marine animal into a position over the net, allowing the user to raise the net to catch the marine animal.

2. The marine animal netting device of claim 1, further including a set of fasteners, each fastener being attached to an outer one of the nested sections and being configured for selectively engaging an inner one of the nested sections, such that the nested sections are selectively fixedly engaged.

3. The marine animal netting device of claim 2, wherein each fastener comprises a thumbscrew positioned in a threaded hole, such that turning of the thumbscrew selectively frictionally engages the thumbscrew to the inner one of the nested sections.

4. The marine animal netting device of claim 1, further including:
   the net comprising:
      a ring, the ring having a first side distal from the first end of the pole,
      a mesh attached to and extending from the ring, and
      a pair of arms extending from a second side of the ring and bracketing the pole;
   a bolt extending through the pair of arms and the pole, such that the net is pivotable relative to the pole; and
   a nut fixedly attached to a respective one of the arms and being opposingly positioned to a head of the bolt, the nut being threadedly engaged to the bolt, such that turning of the bolt selectively tightens the arms to the pole for fixedly positioning the net relative to the pole.

5. The marine animal netting device of claim 4, wherein the first side of the ring is substantially linear.

6. The marine animal netting device of claim 4, further including an aperture positioned in the ring proximate to the first end of the pole, the line extending through the aperture.

7. The marine animal netting device of claim 1, further including an exterior surface of the handle comprising rubber, silicone, or elastomer, wherein the exterior surface is configured for deterring slippage of the hand gripping the handle.

8. The marine animal netting device of claim 1, wherein the first end and the second end of the pole are separated by 3.50 to 5.50 m.

9. The marine animal netting device of claim 8, wherein the first end and the second end are separated by 4.25 to 4.75 m.

10. The marine animal netting device of claim 1, wherein the reel is selectively attachable to the handle.

11. The marine animal netting device of claim 1, further including:
    the plurality of line guides being positioned within the pole; and
    a hole positioned in the pole proximate to the second end, the line extending through the hole and the pole.

12. The marine animal netting device of claim 11, further including a cutout positioned in the pole proximate to the hole, such that line is visible through the cutout.

13. The marine animal netting device of claim 12, wherein:
    the reel is positioned on an upper facet of the handle; and
    the hole and the cutout are positioned in an upper face of the pole.

14. The marine animal netting device of claim 12, further including an indicator attached to the line and visible through the cutout when the connector is positioned over the net.

15. The marine animal netting device of claim 14, wherein the indicator comprises a section of colored line.

16. The marine animal netting device of claim 14, further including a panel attached to the pole and extending over the cutout, the panel being substantially transparent, such that the indicator is visible through the panel.

17. A marine animal netting device comprising:
    a pole, the pole being tubular and comprising a plurality of nested sections, such that the pole is selectively extensible;
    a set of fasteners, each fastener being attached to an outer one of the nested sections and being configured for selectively engaging an inner one of the nested sections, such that the nested sections are selectively fixedly engaged, each fastener comprising a thumbscrew positioned in a threaded hole, such that turning of the thumbscrew selectively frictionally engages the thumbscrew to the inner one of the nested sections;
    a net pivotally attached to the pole proximate to a first end of the pole, the net comprising:
       a ring, a first side of the ring distal from the first end of the pole being substantially linear,
       a mesh attached to and extending from the ring, and
       a pair of arms extending from a second side of the ring and bracketing the pole;
    a bolt extending through the pair of arms and the pole, such that the net is pivotable relative to the pole;
    a nut fixedly attached to a respective one of the arms and being opposingly positioned to a head of the bolt, the nut being threadedly engaged to the bolt, such that turning of the bolt selectively tightens the arms to the pole for fixedly positioning the net relative to the pole;
    a handle attached to a second end of the pole, an exterior surface of the handle comprising rubber, silicone, or elastomer, wherein the exterior surface is configured for deterring slippage of the hand gripping the handle, the first end and the second end of the pole being separated by 3.50 to 5.50 m, the first end and the second end being separated by 4.25 to 4.75 m;
a plurality of line guides attached to the pole, the plurality of line guides being positioned within the pole; and;
a reel attached to the handle, the reel being positioned on an upper facet of the handle, the reel being selectively attachable to the handle;
a line loopedly positioned on and selectively extensible from the reel through the line guides and past the net;
a connector attached to a terminus of the line and being configured for connecting to a bait, wherein the handle is configured for gripping in a hand of a user for manipulating the net and the bait into a body of water for attracting a marine animal, wherein the reel is configured for reeling in the bait and the marine animal into a position over the net, allowing the user to raise the net to catch the marine animal;
a hole positioned in the pole proximate to the second end, the line extending through the hole, the hole being positioned in an upper face of the pole;
an aperture positioned in the ring proximate to the first end of the pole, the line extending through the aperture;
a cutout positioned in the pole proximate to the hole, such that line is visible through the cutout, the cutout being positioned in the upper face of the pole;
an indicator attached to the line and visible through the cutout when the connector is positioned over the net, the indicator comprising a section of colored line; and
a panel attached to the pole and extending over the cutout, the panel being substantially transparent, such that the indicator is visible through the panel.

18. A method of catching a marine animal comprising the steps of:
providing a marine animal netting device comprising:
a pole, the pole being tubular and comprising a plurality of nested sections, such that the pole is selectively extensible,
a net pivotally attached to the pole proximate to a first end of the pole,
a handle attached to a second end of the pole,
a plurality of line guides attached to the pole,
a reel attached to the handle,
a line loopedly positioned on and selectively extensible from the reel through the line guides and past the net, and
a connector attached to a terminus of the line and being configured for connecting to a bait;
extending the pole to a desired length;
pivoting the net to a desired angle relative to the pole;
extending the connector to a desired position past the net;
providing a bait and attaching the bait to the connector;
gripping the handle and using the pole to manipulate the net and the bait into a body of water;
waiting for a marine animal to attach to the bait;
reeling in the bait and the marine animal into a position over the net; and
raising the net to catch the marine animal.

\* \* \* \* \*